(12) United States Patent
Chen et al.

(10) Patent No.: US 12,080,871 B1
(45) Date of Patent: Sep. 3, 2024

(54) NEGATIVE ELECTRODE PARTICLE AND PREPARING METHOD THEREOF, NEGATIVE ELECTRODE SHEET, AND ENERGY-STORAGE APPARATUS

(71) Applicant: Xiamen Hithium Energy Storage Technology Co., Ltd., Fujian (CN)

(72) Inventors: Qingchun Chen, Fujian (CN); Shiwen Wang, Fujian (CN); Yingxin Lin, Fujian (CN); Kaida Zhu, Fujian (CN); Min Zhang, Fujian (CN)

(73) Assignee: Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/606,810

(22) Filed: Mar. 15, 2024

(30) Foreign Application Priority Data

May 22, 2023 (CN) .......................... 202310575504.5

(51) Int. Cl.
*H01M 4/04* (2006.01)
*H01M 4/36* (2006.01)
*H01M 4/62* (2006.01)
*H01M 4/02* (2006.01)

(52) U.S. Cl.
CPC ....... *H01M 4/0471* (2013.01); *H01M 4/0404* (2013.01); *H01M 4/366* (2013.01); *H01M 4/625* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2016/0156031 A1* | 6/2016 | Kim | ...................... C01B 33/029 429/218.1 |
| 2021/0202941 A1 | 7/2021 | Kim et al. | |

FOREIGN PATENT DOCUMENTS

| | | |
|---|---|---|
| CN | 106145096 A | 11/2016 |
| CN | 114792782 A | 7/2022 |
| CN | 115332532 A | 11/2022 |
| CN | 115676804 A | 2/2023 |
| CN | 116130637 A | 5/2023 |
| DE | 10031123 A1 | 4/2002 |

OTHER PUBLICATIONS

CNIPA, Notification of Grant of Patent Right for Invention for corresponding Chinese Patent Application No. 202310575504.5, Jul. 1, 2023, 7 pages.

Zhao, Fei et al. "Review on Electrode Materials and Capacitive Deionization (CDI) Technology for Desalination," Technology of Water Treatment, vol. 42, No. 5, May 2016, 21 pages.

* cited by examiner

*Primary Examiner* — Wyatt P McConnell
(74) *Attorney, Agent, or Firm* — IP Spring

(57) ABSTRACT

A negative electrode particle and a preparing method thereof, a negative electrode sheet, and an energy-storage apparatus are provided. The negative electrode particle provided in the disclosure defines a closed pore located inside the negative electrode particle and an open pore located on a surface of the negative electrode particle. A ratio of a pore volume C1 of the closed pore to a pore volume C2 of the open pore satisfies: $6 \leq C1/C2 \leq 11$, and the pore volume C1 of the closed pore satisfies: $0.03 \text{ cm}^3/\text{g} \leq C1 \leq 0.12 \text{ cm}^3/\text{g}$.

20 Claims, 4 Drawing Sheets

NEGATIVE ELECTRODE PARTICLE AND PREPARING METHOD THEREOF, NEGATIVE ELECTRODE SHEET, AND ENERGY-STORAGE APPARATUS

CROSS-REFERENCE TO RELATED APPLICATIONS

This application claims priority under 35 U.S.C. § 119(a) to Chinese Patent Application No. 202310575504.5, filed May 22, 2023, the entire disclosure of which is incorporated herein by reference.

TECHNICAL FIELD

This disclosure relates to the field of battery technologies, and specifically relates to a negative electrode particle and a preparing method thereof, a negative electrode sheet, and an energy-storage apparatus.

BACKGROUND

With the continuous development of battery technologies, batteries are required to have relatively high energy densities and relatively good cycling performances, and thus negative electrode materials, as key materials of batteries, face a series of challenges. A relatively low gram capacity and relatively low initial coulombic efficiency of the negative electrode material may result in that an energy density of the battery cannot be further increased. Nano pore passages in the negative electrode material can increase storage sites for active ions, thereby improving the gram capacity of the negative electrode material. However, with the increase in nano pore passages, it is easy to lead to an increase in side reactions between the negative electrode material and electrolyte, thereby resulting in a relatively poor cycling performance of the battery.

SUMMARY

A negative electrode particle is provided in embodiments of the first aspect of the disclosure. The negative electrode particle defines a closed pore located inside the negative electrode particle and an open pore located on a surface of the negative electrode particle. A ratio of a pore volume C1 of the closed pore to a pore volume C2 of the open pore satisfies: $6 \leq C1/C2 \leq 11$. The pore volume C1 of the closed pore satisfies: $0.03 \text{ cm}^3/\text{g} \leq C1 \leq 0.12 \text{ cm}^3/\text{g}$.

A preparing method of the negative electrode particle is provided in embodiments of the second aspect of the disclosure. The method includes the following. A precursor and a soluble salt are provided. A first particle is obtained by placing the precursor into a soluble salt system and pre-carbonizing the precursor at a first temperature. The first particle includes the precursor and a soluble salt dispersed in the precursor, and the first temperature is higher than a melting temperature of the soluble salt. A second particle is obtained by removing the soluble salt in the first particle. The negative electrode particle is obtained by carbonizing the second particle at a second temperature. The second temperature is higher than the first temperature. The negative electrode particle defines a closed pore located inside the negative electrode particle and an open pore located on a surface of the negative electrode particle. A ratio of a pore volume C1 of the closed pore to a pore volume C2 of the open pore satisfies: $6 \leq C1/C2 \leq 11$, and the pore volume C1 of the closed pore satisfies: $0.03 \text{ cm}^3/\text{g} \leq C1 \leq 0.12 \text{ cm}^3/\text{g}$.

A negative electrode sheet is provided in embodiments of the third aspect of the disclosure. The negative electrode sheet includes a current collector and an active substance layer. The active substance layer is disposed on a surface of the current collector. The active substance layer includes the negative electrode particle as described in embodiments of the disclosure. The negative electrode particle defines a closed pore located inside the negative electrode particle and an open pore located on a surface of the negative electrode particle. A ratio of a pore volume C1 of the closed pore to a pore volume C2 of the open pore satisfies: $6 \leq C1/C2 \leq 11$. The pore volume C1 of the closed pore satisfies: $0.03 \text{ cm}^3/\text{g} \leq C1 \leq 0.12 \text{ cm}^3/\text{g}$.

BRIEF DESCRIPTION OF THE DRAWINGS

In order to describe technical solutions in embodiments of the disclosure more clearly, the following will give a brief introduction to accompanying drawings required for describing embodiments. Apparently, the accompanying drawings hereinafter described merely illustrate some embodiments of the disclosure. Based on these drawings, those of ordinary skill in the art can also obtain other drawings without creative effort.

Description of reference signs of the accompanying drawings:
100—negative electrode particle, 101—closed pore, 102—open pore, 200—negative electrode sheet, 210—current collector, 220—active substance layer, 300—energy-storage apparatus, 310—separator, 320—positive electrode sheet.

DETAILED DESCRIPTION

In order to facilitate better understanding of solution of the disclosure by those of ordinary skill in the art, the following will illustrate clearly and completely technical solutions of embodiments of the disclosure with reference to accompanying drawings of embodiments of the disclosure. Apparently, embodiments illustrated herein are merely some, rather than all, of the disclosure. Based on the embodiments of the disclosure, all other embodiments obtained by those of ordinary skill in the art without creative effort shall fall within the protection scope of the disclosure.

The terms "first", "second", and the like used in the specification, the claims, and the accompanying drawings of the disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The following will illustrate technical solutions in embodiments of the disclosure with reference to the accompanying drawings.

It needs to be noted that, for convenience of illustration, the same reference sign of the accompanying drawings represents the same component in embodiments of the disclosure, and for sake of simplicity, detailed illustration of the same component is omitted in different embodiments.

With the continuous development of battery technologies, batteries are required to have relatively high energy densities and relatively good cycling performances, and thus negative electrode materials, as key materials of batteries, face a series of challenges. A relatively low gram capacity and relatively low initial coulombic efficiency of the negative electrode material may result in that an energy density of the battery cannot be further increased. Nano pore passages in the negative electrode material can increase storage sites for active ions, thereby improving the gram capacity of the negative electrode material. However, with the increase in nano pore passages, side reactions between the negative electrode material and electrolyte may be increased, thereby resulting in a relatively poor cycling performance of the battery.

Figure 1:
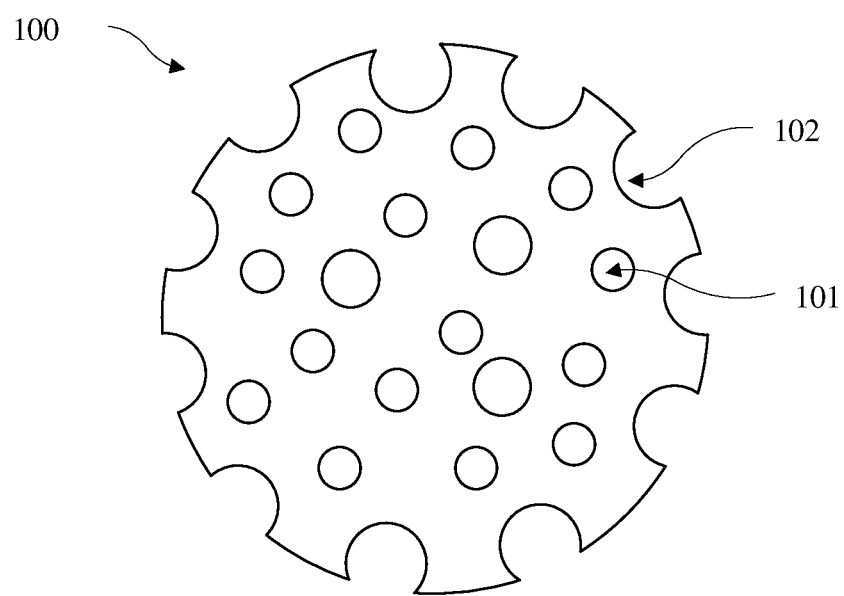
FIG. 1 is a schematic structural view of a negative electrode particle in an embodiment of the disclosure.

Referring to FIG. 1, a negative electrode particle 100 is provided in embodiments of the first aspect of the disclosure. The negative electrode particle 100 defines a closed pore 101 located inside the negative electrode particle 100 and an open pore 102 located on a surface of the negative electrode particle 100. A ratio of a pore volume C1 of the closed pore 101 to a pore volume C2 of the open pore 102 satisfies: $6 \leq C1/C2 \leq 11$. The pore volume C1 of the closed pore 101 satisfies: $0.03 \text{ cm}^3/\text{g} \leq C1 \leq 0.12 \text{ cm}^3/\text{g}$.

Specifically, the ratio of the pore volume of the closed pore 101 to the pore volume of the open pore 102 may be 6, 7, 8, 9, 10, 11, or any value between the above values. Specifically, the pore volume of the closed pore 101 may be 0.03 cm$^3$/g, 0.04 cm$^3$/g, 0.05 cm$^3$/g, 0.06 cm$^3$/g, 0.07 cm$^3$/g, 0.08 cm$^3$/g, 0.09 cm$^3$/g, 0.10 cm$^3$/g, 0.11 cm$^3$/g, 0.12 cm$^3$/g, or any value between the above values.

It is to be understood that the closed pore 101 refers to a cavity and a pore passage in a particle, which is not connected to the outside world. The open pore 102 refers to a cavity and a pore passage in a particle, which is connected to the outside world.

It may be understood that a true open pore 102 and a true closed pore 101 in the negative electrode particle 100 are in irregular shapes, and regular shapes in FIG. 1 are illustrated for convenience of illustration only.

It may be understood that the negative electrode particle 100 may be, but is not limited to, hard carbon, graphite, soft carbon, etc.

When the negative electrode particle 100 defines the closed pore 101 located inside the negative electrode particle 100 and the open pore 102 located on the surface of the negative electrode particle 100, with the open pore 102 on the surface of the negative electrode particle 100, not only is a storage site for an active ion provided, but also immersion of the negative electrode particle 100 by electrolyte is facilitated, thereby constructing an ionic conduction channel. However, due to the open pore 102 on the surface of the negative electrode particle 100, side reactions between the negative electrode particle 100 and the electrolyte may be increased, and initial efficiency of the negative electrode particle 100 may be reduced. With the closed pore 101 in the negative electrode particle 100, storage sites for active ions are increased, which to a certain extent improve the gram capacity and the initial efficiency of the negative electrode particle 100. However, too many closed pores 101 in the negative electrode particle 100 may affect immersion of the negative electrode particle 100 by the electrolyte, which may lead to a limit to the ion conduction channel, and thus the gram capacity of the negative electrode particle 100 may be reduced. By controlling that the ratio of the pore volume of the closed pore 101 to the pore volume of the open pore 102 ranges from 6 to 11 and the pore volume of the closed pore 101 ranges from 0.03 cm$^3$/g to 0.12 cm$^3$/g, it is possible to construct a certain ion conduction channel and avoid a serious side reaction between the negative electrode particle 100 and the electrolyte. Meanwhile, the negative electrode particle 100 has many storage sites for active ions, so that the negative electrode particle 100 may have a relatively high gram capacity and relatively high initial efficiency. When the negative electrode particle 100 is applied to an energy-storage apparatus 300, a cycling performance of the energy-storage apparatus 300 may not be affected.

In some embodiments, the pore volume C2 of the open pore 102 satisfies: $0.005 \text{ cm}^3/\text{g} \leq C2 \leq 0.01 \text{ cm}^3/\text{g}$. Specifically, the pore volume C2 of the open pore 102 may be 0.005 cm$^3$/g, 0.006 cm$^3$/g, 0.007 cm$^3$/g, 0.008 cm$^3$/g, 0.009 cm$^3$/g, 0.01 cm$^3$/g, or any value between the above values.

When the pore volume of the open pore 102 is less than 0.005 cm$^3$/g, the electrolyte is relatively difficult to immerse the negative electrode particle 100, and thus the negative electrode particle 100 has a relatively poor rate performance. When the pore volume of the open pore 102 is greater than 0.01 cm$^3$/g, side reactions between the negative electrode particle 100 and the electrolyte are increased, and thus the initial efficiency of the negative electrode particle 100 is reduced. When the pore volume of the open pore 102 ranges from 0.005 cm$^3$/g to 0.01 cm$^3$/g, the negative electrode particle 100 may have a good rate performance and relatively high initial efficiency.

In some embodiments, an average pore diameter D1 of the closed pore 101 of the negative electrode particle 100 satisfies: $0.8 \text{ nm} \leq D1 \leq 2.0 \text{ nm}$. Specifically, the average pore diameter D1 of the closed pore 101 of the negative electrode particle 100 may be 0.8 nm, 1.0 nm, 1.2 nm, 1.4 nm, 1.6 nm, 1.8 nm, 2.0 nm, or any value between the above values.

When the average pore diameter of the closed pore 101 is less than 0.8 nm, active ions are difficult to be embedded, thereby affecting the gram capacity of the negative electrode particle 100. When the average pore diameter of the closed pore 101 is greater than 2.0 nm, binding energy of the active ions becomes relatively large, which is unfavorable to embedding and dis-embedding of the active ions. When the average pore diameter of the closed pore 101 ranges from 0.8 nm to 2.0 nm, the active ions are relatively easy to be embedded and dis-embedded, which is conducive to improving the gram capacity of the negative electrode particle 100.

In some embodiments, a ratio of a specific surface area S1 of the closed pore of the negative electrode particle to a specific surface area S of the negative electrode particle satisfies: $40 \leq S1/S \leq 200$. Specifically, the ratio of the specific surface area S1 of the closed pore 101 of the negative electrode particle 100 to the specific surface area S of the negative electrode particle 100 may be 40, 50, 70, 90, 110, 130, 150, 170, 190, 200, or any value between the above values.

It may be understood that the specific surface area of the closed pore 101 of the negative electrode particle 100 is the sum of areas of inner walls of closed pores 101 of the negative electrode particle 100 per unit weight.

It may be understood that the specific surface area of the negative electrode particle 100 is an external surface area of the negative electrode particle 100 per unit weight plus a specific surface area of the open pore 102 of the negative electrode particle 100.

When the ratio of the specific surface area S1 of the closed pore 101 to the specific surface area S of the negative electrode particle 100 is less than 40, the specific surface area S of the negative electrode particle 100 is relatively large, and thus a contact area between the negative electrode particle 100 and the electrolyte is increased, which may reduce the initial efficiency of the negative electrode particle 100. When the ratio of the specific surface area S1 of the closed pore 101 to the specific surface area S of the negative electrode particle 100 is greater than 200, the specific surface area of the open pore 102 is too small, and thus the contact area between the negative electrode particle 100 and the electrolyte is small, so that the electrolyte is relatively difficult to immerse the negative electrode particle 100, and the rate performance of the negative electrode particle 100 is relatively poor. When the ratio of the specific surface area S1 of the closed pore 101 to the specific surface area S of the negative electrode particle 100 ranges from 40 to 200, the negative electrode particle 100 has relatively good initial efficiency and a relatively good rate performance.

In some embodiments, the specific surface area S1 of the closed pore 101 satisfies: 40 $m^2/g \leq S1 \leq 400$ $m^2/g$. Specifically, the specific surface area of the closed pore 101 may be 40 $m^2/g$, 60 $m^2/g$, 80 $m^2/g$, 100 $m^2/g$, 120 $m^2/g$, 140 $m^2/g$, 160 $m^2/g$, 180 $m^2/g$, 200 $m^2/g$, 220 $m^2/g$, 240 $m^2/g$, 260 $m^2/g$, 280 $m^2/g$, 300 $m^2/g$, 320 $m^2/g$, 340 $m^2/g$, 360 $m^2/g$, 380 $m^2/g$, 400 $m^2/g$, or any value between the above values.

When the specific surface area of the closed pore 101 is less than 40 $m^2/g$, there are relatively few storage sites for active ions of the negative electrode particle 100, and thus the negative electrode particle 100 has a relatively low gram capacity. When the specific surface area of the closed pore 101 is greater than 400 $m^2/g$, the negative electrode particle 100 is of an unstable structure, which in turn reduces a compaction density of the negative electrode particle 100. When the specific surface area of the closed pore 101 ranges from 40 $m^2/g$ to 400 $m^2/g$, the negative electrode particle 100 has a relatively high gram capacity and a relatively high compaction density.

In some embodiments, the specific surface area S of the negative electrode particle satisfies: 1 $m^2/g \leq S \leq 5$ $m^2/g$. Specifically, the specific surface area S of the negative electrode particle 100 may be 1 $m^2/g$, 2 $m^2/g$, 3 $m^2/g$, 4 $m^2/g$, 5 $m^2/g$, or any value between the above values.

When the specific surface area S of the negative electrode particle 100 is less than 1 $m^2/g$, the contact area between the negative electrode particle 100 and the electrolyte is small, so that the electrolyte is relatively difficult to immerse the negative electrode particle 100, and the rate performance of the negative electrode particle 100 is relatively poor. When the specific surface area S of the negative electrode particle 100 is greater than 5 $m^2/g$, the contact area between the negative electrode particle 100 and the electrolyte is increased, which may reduce the initial efficiency of the negative electrode particle 100. When the specific surface area S of the negative electrode particle 100 ranges from 1 $m^2/g$ to 5 $m^2/g$, the negative electrode particle 100 has relatively good initial efficiency and a relatively good rate performance.

In some embodiments, when the negative electrode particle is of a layered structure, a ratio of a true density $\rho_1$ of the negative electrode particle to a theoretical density $\rho_2$ of the negative electrode particle satisfies: $0.75 \leq \rho_1/\rho_2 \leq 0.95$. Specifically, the ratio of the true density $\rho_1$ of the negative electrode particle 100 to the theoretical density $\rho_2$ of the negative electrode particle 100 may be 0.75, 0.8, 0.85, 0.9, 0.95, or any value between the above values.

It is to be understood that the true density refers to an actual mass of solid matter of a material per unit volume in an absolutely dense state, i.e., a density after removal of an internal pore or an inter-particle gap.

It may be understood that since the true density is tested through nitrogen adsorption, the internal pore removed herein is merely the open pore 102.

It may be understood that the theoretical density refers to a highest true density of a material in an ideal state, where the ideal state means that there is no pore inside the material or no gap between particles. The theoretical density of the negative electrode particle 100 of the layered structure is 2.26 $g/cm^3$.

When the ratio of the true density $\rho_1$ of the negative electrode particle 100 to the theoretical density $\rho_2$ of the negative electrode particle 100 is less than 0.75, the negative electrode particle 100 has a relatively low compaction density, which may reduce an energy density of the energy-storage apparatus 300 when the negative electrode particle 100 is applied to the energy-storage apparatus 300. When the ratio of the true density $\rho_1$ of the negative electrode particle 100 to the theoretical density $\rho_2$ of the negative electrode particle 100 is greater than 0.95, the negative electrode particle 100 has relatively few storage sites for active ions, and thus the negative electrode particle 100 has a relatively low gram capacity. When the ratio of the true density $\rho_1$ of the negative electrode particle 100 to the theoretical density $\rho_2$ of the negative electrode particle 100 ranges from 0.75 to 0.95, the negative electrode particle 100 has a relatively high compaction density and a relatively high gram capacity.

In some embodiments, the true density $\rho_1$ of the negative electrode particle 100 satisfies: 1.8 $g/cm^3 \leq \rho_1 \leq 2.1$ $g/cm^3$. Specifically, the true density of the negative electrode particle 100 may be 1.8 $g/cm^3$, 1.9 $g/cm^3$, 2.0 $g/cm^3$, 2.1 $g/cm^3$, or any value between the above values.

When the true density of the negative electrode particle 100 is less than 1.8 $g/cm^3$, the negative electrode particle 100 has a relatively low compaction density, which may reduce the energy density of the energy-storage apparatus 300 when the negative electrode particle 100 is applied to the energy-storage apparatus 300. When the true density of the negative electrode particle 100 is greater than 2.1 $g/cm^3$, the negative electrode particle 100 has relatively few storage sites for active ions, and thus the negative electrode particle 100 has a relatively low gram capacity. When the true density of the negative electrode particle 100 ranges from 1.8 $g/cm^3$ to 2.1 $g/cm^3$, the negative electrode particle 100 has a relatively high compaction density and a relatively high gram capacity.

Figure 2:
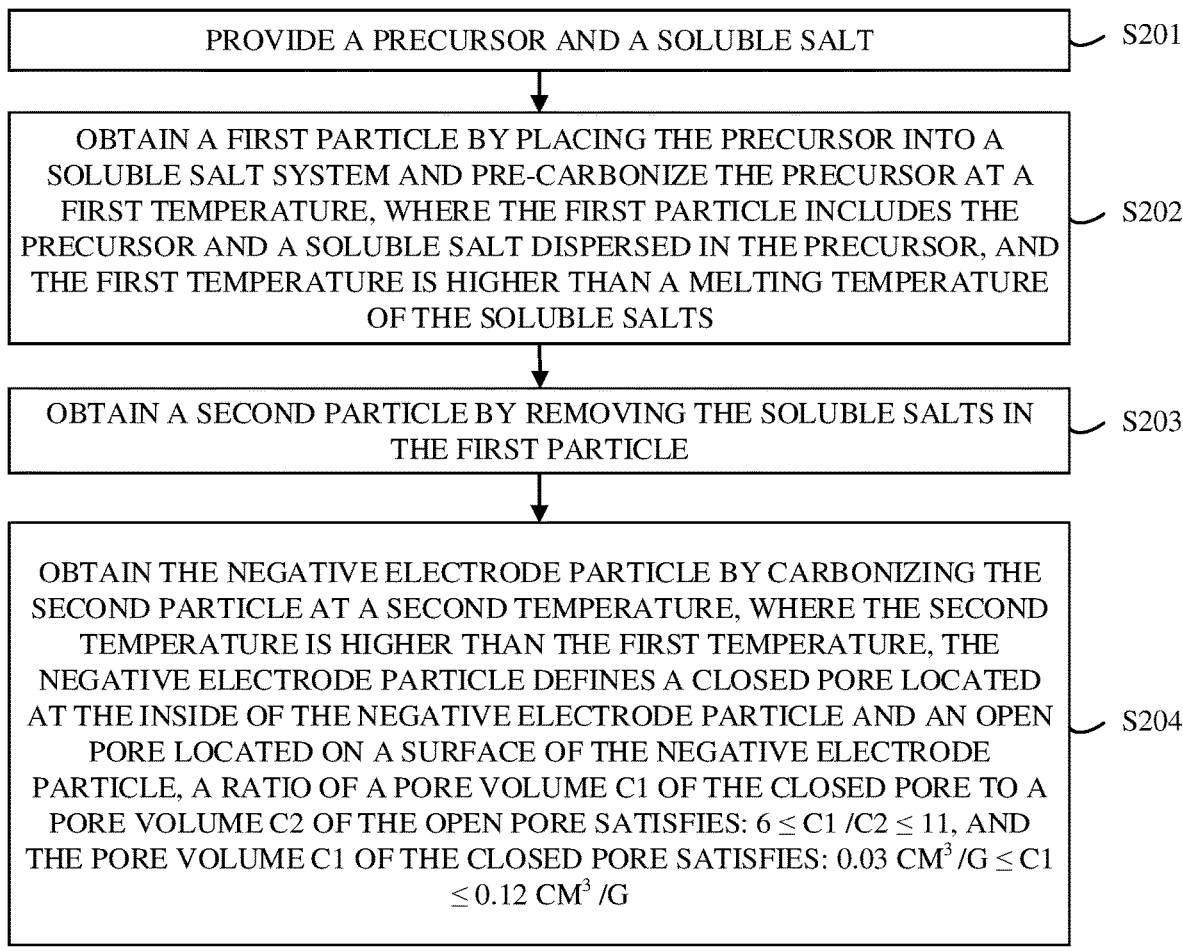
FIG. 2 is a flow chart illustrating a preparing method of a negative electrode particle in an embodiment of the disclosure.

Referring to FIG. 2, a preparing method of the negative electrode particle 100 is provided in embodiments of the second aspect of the disclosure. The method includes the following.

S201, a precursor and a soluble salt are provided.

S202, a first particle is obtained by placing the precursor into a soluble salt system and pre-carbonizing the precursor at a first temperature. The first particle includes the precursor and a soluble salt dispersed in the precursor, and the first temperature is higher than a melting temperature of the soluble salt.

S203, a second particle is obtained by removing the soluble salt in the first particle.

S204, the negative electrode particle 100 is obtained by carbonizing the second particle at a second temperature. The second temperature is higher than the first temperature. The negative electrode particle 100 defines a closed pore 101 located inside the negative electrode particle 100 and an open pore 102 located on a surface of the negative electrode particle 100. A ratio of a pore volume C1 of the closed pore 101 to a pore volume C2 of the open pore 102 satisfies: $6 \leq C1/C2 \leq 11$, and the pore volume C1 of the closed pore 101 satisfies: $0.03 \text{ cm}^3/\text{g} \leq C1 \leq 0.12 \text{ cm}^3/\text{g}$.

By placing the precursor into the soluble salt system and pre-carbonizing the precursor at the first temperature, the soluble salt is in a molten state, volatile components of the precursor are gradually volatilized at the first temperature, and pores are formed. The soluble salt in the molten state occupies the pore, the negative electrode particle 100 is obtained through carbonization after removal of the soluble salt, and the pores in the negative electrode particle 100 are relatively small. The ratio of the pore volume of the closed pore 101 to the pore volume of the open pore 102 ranges from 6 to 11, and the pore volume of the closed pore 101 ranges from 0.03 cm$^3$/g to 0.12 cm$^3$/g, so that it is possible to construct a certain ion conduction channel and avoid a serious side reaction between the negative electrode particle 100 and the electrolyte. Meanwhile, the negative electrode particle 100 has many storage sites for active ions, so that the negative electrode particle 100 may have a relatively high gram capacity and relatively high initial efficiency. When the negative electrode particle 100 is applied to an energy-storage apparatus 300, a cycling performance of the energy-storage apparatus 300 may not be affected.

It may be understood that the precursor may be, but is not limited to, at least one of bitumen, petroleum coke, sub-bituminous coal, bituminous coal, a biomass resin, a coconut shell, a walnut shell, or the like.

Furthermore, a carbon content of the precursor ranges from 20% to 70%.

In embodiments of the disclosure, when it comes to a value ranging from a to b, it is indicated that the value may be any value between a and b, including endpoint values a and b, unless specifically indicated.

Specifically, the carbon content of the precursor may be 20%, 40%, 60%, 70%, or any value between the above values.

When the carbon content of the precursor is less than 20%, the negative electrode particle 100 has a low yield rate of carbon, which means that the negative electrode particle 100 obtained through the precursor has a low conversion rate. When the carbon content of the precursor is greater than 70%, the precursor has few volatile components, and thus the negative electrode particle 100 obtained finally has few pores. When the carbon content of the precursor ranges from 20% to 70%, the precursor has a relatively high yield rate of carbon, and the negative electrode particle 100 obtained has many pores, so that the negative electrode particle 100 has many storage sites for active ions.

It may be understood that the soluble salt refers to a salt soluble in a liquid (e.g., a salt soluble in water, a salt soluble in an organic solvent, etc.).

It may be understood that the soluble salt may be, but is not limited to, at least one of sodium chloride, potassium chloride, calcium chloride, sodium fluoride, potassium fluoride, sodium hydroxide, potassium hydroxide, or the like.

In some embodiments, a mass ratio of the soluble salt to the precursor ranges from 10% to 200%.

Specifically, the mass ratio of the soluble salt to the precursor may be 10%, 20%, 40%, 60%, 80%, 100%, 120%, 140%, 160%, 180%, 200%, or any value between the above values.

When the mass ratio of the soluble salt to the precursor is less than 10%, the volatile components of the precursor are gradually volatilized, pores are formed, and the soluble salt in the molten state is unable to completely occupy the pores, resulting in that the pores are easily closed at a high temperature, thereby decreasing storage sites for active ions in the negative electrode particle 100 and reducing the gram capacity. When the mass ratio of the soluble salt to the precursor is greater than 200%, a preparation cost of the negative electrode particle 100 may be increased. When the mass ratio of the soluble salt to the precursor ranges from 10% to 200%, the negative electrode particle 100 may have many storage sites for active ions and a relatively high gram capacity, and the preparation cost is relatively low.

In some embodiments, a density of the precursor is greater than or equal to a density of the soluble salt in the molten state. In other words, the density of the precursor is greater than or equal to a density of a molten liquid of the soluble salt.

When the density of the precursor is greater than or equal to the density of the soluble salt in the molten state and the soluble salt is in the molten state, the precursor can be fully in contact with the soluble salt, and the soluble salt in the molten state can better occupy the pore in the precursor, thereby avoiding rapid shrinkage or even closure of the pores under the effect of a high temperature.

In some embodiments, the precursor is placed into the soluble salt system and the precursor is pre-carbonized at the first temperature as follows. The precursor is placed into the soluble salt system, and the precursor is pre-carbonized by increasing temperature to the first temperature at a first heating rate R1 satisfying: $0.5° \text{ C./min} \leq R1 \leq 3° \text{ C./min}$. The first temperature T1 satisfies: $400° \text{ C.} \leq T1 \leq 1000° \text{ C.}$ Specifically, the first heating rate R1 may be 0.5° C./min, 1° C./min, 2° C./min, 3° C./min, or any value between the above values. Specifically, the first temperature T1 may be 400° C., 500° C., 600° C., 700° C., 800° C., 900° C., 1000° C., or any value between the above values.

When the first heating rate R1 is less than 0.5° C./min, heating consumes too much time, and a preparing cost is increased. When the first heating rate R1 is greater than 3° C./min, the volatile components are volatilized relatively fast, and the pores obtained have relatively large pore diameters, resulting in that binding energy of the active ions becomes relatively large, which is unfavorable to embedding and dis-embedding of the active ions. When the first heating rate R1 ranges from 0.5° C./min to 3° C./min, it helps to form relatively small pores, and the preparing cost may not be increased too much.

When the first temperature T1 is less than 400° C., the soluble salt is unable to be melted, or the volatile components cannot be completely volatilized. When the first temperature T1 is greater than 1000° C., the pores obtained after volatilization of the volatile components may be shrunk or even partially closed, resulting in that the soluble salt is unable to be removed in a subsequent process, thereby affecting the gram capacity of the negative electrode particle 100 and thus increasing the preparing cost. When the first temperature T1 ranges from 400° C. to 1000° C., the soluble salt is in the molten state, the volatile components of the precursor are gradually volatilized at the first temperature, and pores are formed. The soluble salt in the molten state occupies the pore and is easily removed in the subsequent process, the negative electrode particle 100 is obtained through carbonization after removal of the soluble salt, and the pores in the negative electrode particle 100 are relatively small.

In some embodiments, the negative electrode particle 100 is obtained by carbonizing the second particle at the second temperature as follows. The second particle is carbonized by increasing temperature to the second temperature at a second heating rate R2 satisfying: 1° C./min≤R2≤10° C./min. The second heating rate R2 is greater than the first heating rate R1, and the second temperature T2 satisfies: 1000° C.≤T2≤1700° C.

Specifically, the second heating rate R2 may be 1° C./min, 2° C./min, 3° C./min, 4° C./min, 5° C./min, 6° C./min, 7° C./min, 8° C./min, 9° C./min, 10° C./min, or any value between the above values. Specifically, the second temperature T2 may be 1000° C., 1100° C., 1200° C., 1300° C., 1400° C., 1500° C., 1600° C., 1700° C., or any value between the above values.

When the second heating rate R2 is less than 1° C./min, heating consumes too much time, and thus the preparing cost is increased, and the negative electrode particle 100 has relatively few closed pores 101, which is not conducive to improving the gram capacity of the negative electrode particle 100. When the second heating rate R2 is greater than 10° C./min, a heating device is subject to relatively great loss, and thus a service life of the device is reduced. When the second heating rate R2 ranges from 1° C./min to 10° C./min, the degree of disorder in the negative electrode particle 100 may be intensified, which may increase internal closed pores 101 and improve the gram capacity of the negative electrode particle 100.

When the second temperature T2 is less than 1000° C., the negative electrode particle 100 has many defects, resulting in low initial efficiency. When the second temperature T2 is greater than 1700° C., a layer spacing of the negative electrode particle 100 becomes narrow, which is not conducive to storing active ions, and the preparing cost of the negative electrode particle 100 is increased. When the second temperature T2 ranges from 1000° C. to 1700° C., the negative electrode particle 100 has relatively high initial efficiency, active ions are easy to be stored, and the preparing cost may not be increased significantly.

In some embodiments, the second heating rate R2 is greater than the first heating rate R1.

When the second heating rate R2 is greater than the first heating rate R1, it is conducive to forming relatively small pores and intensifying the degree of disorder in the negative electrode particle 100, and thus internal micro-pores may be increased and the gram capacity of the negative electrode particle 100 may be improved.

In some embodiments, after obtaining the second particle by removing the soluble salt in the first particle, and before carbonizing the second particle at the second temperature, the method further includes the following. A carbon layer is deposited on a surface of the second particle to close part of open pores 102 located at the surface of the second particle to form closed pores 101, so that the negative electrode particle 100 may have many closed pores 101 and few open pores 102.

It may be understood that the carbon layer may be deposited on the surface of the second particle by chemical vapor deposition.

By depositing the carbon layer on the surface of the second particle to close part of the open pores 102 located at the surface of the second particle to form the closed pores 101, it is possible to avoid an increase in the side reactions between the negative electrode particle 100 and the electrolyte and avoid a reduction in the initial efficiency of the negative electrode particle 100.

In some embodiments, after carbonizing the second particle at the second temperature, the method further includes the following. The carbon layer is deposited on a surface of the carbonized second particle to close part of open pores 102 located at the surface of the carbonized second particle to form closed pores 101.

By depositing the carbon layer on the surface of the carbonized second particle to close part of the open pores 102 located at the surface of the carbonized second particle to form the closed pores 101, it is possible to avoid an increase in the side reactions between the negative electrode particle 100 and the electrolyte and avoid a reduction in the initial efficiency of the negative electrode particle 100.

In some embodiments, the carbon layer is deposited at a third temperature T3 for a deposition time ranging from 1 h to 4 h, where the third temperature T3 satisfies: 800° C.≤T3≤1200° ° C.

Specifically, the third temperature T3 may be 800° C., 850° C., 900° C., 950° C., 1000° C., 1100° C., 1200° C., or any value between the above values. The deposition time may be 1 h, 2 h, 3 h, 4 h, or any value between the above values.

When the third temperature T3 is less than 800° C., the carbon layer obtained by deposition has a relatively poor electrical conductivity. When the third temperature T3 is greater than 1200° C., the layer spacing of the negative electrode particle 100 is relatively narrow, which in turn affects a dynamic performance. When the third temperature T3 ranges from 800° C. to 1200° C., the carbon layer obtained by deposition has both a relatively good electrical conductivity and a relatively good dynamic performance.

Figure 3:
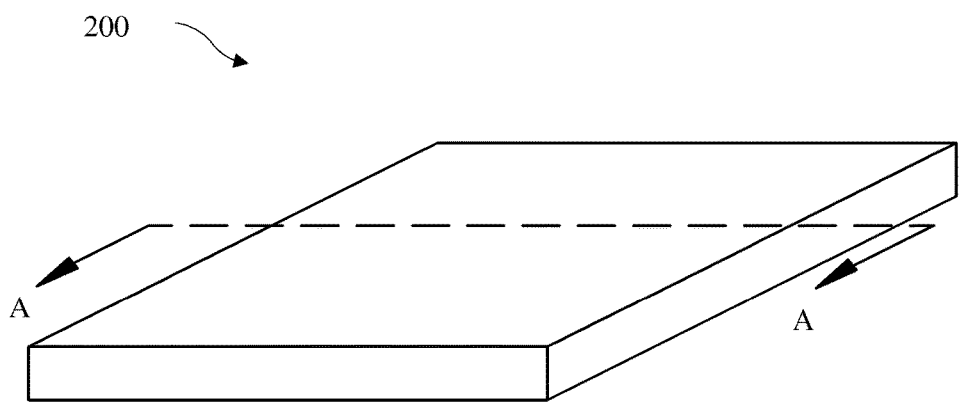
FIG. 3 is a schematic structural view of a negative electrode sheet in an embodiment of the disclosure.
Figure 4:
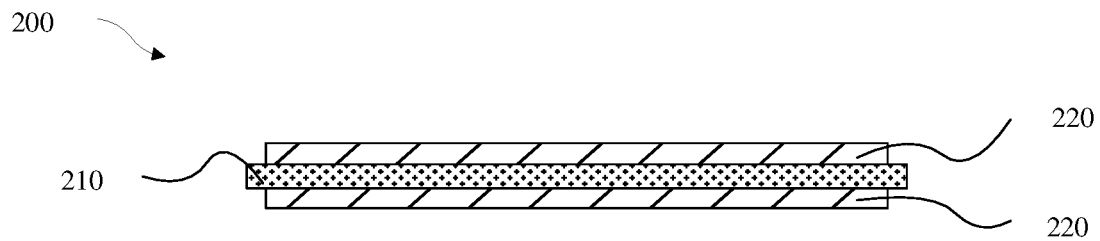
FIG. 4 is a schematic cross-sectional structural view of a negative electrode sheet in an embodiment of the disclosure, taken along line A-A in FIG. 3.

Referring to FIG. 3 and FIG. 4, a negative electrode sheet 200 is provided in embodiments of the third aspect of the disclosure. The negative electrode sheet 200 includes a current collector 210 and an active substance layer 220. The active substance layer 220 is disposed on a surface of the current collector 210. The active substance layer 220 includes the negative electrode particle 100 as described in embodiments of the disclosure.

It may be understood that the current collector 210 may be, but is not limited to, a copper foil, an aluminum foil, etc.

Figure 5:
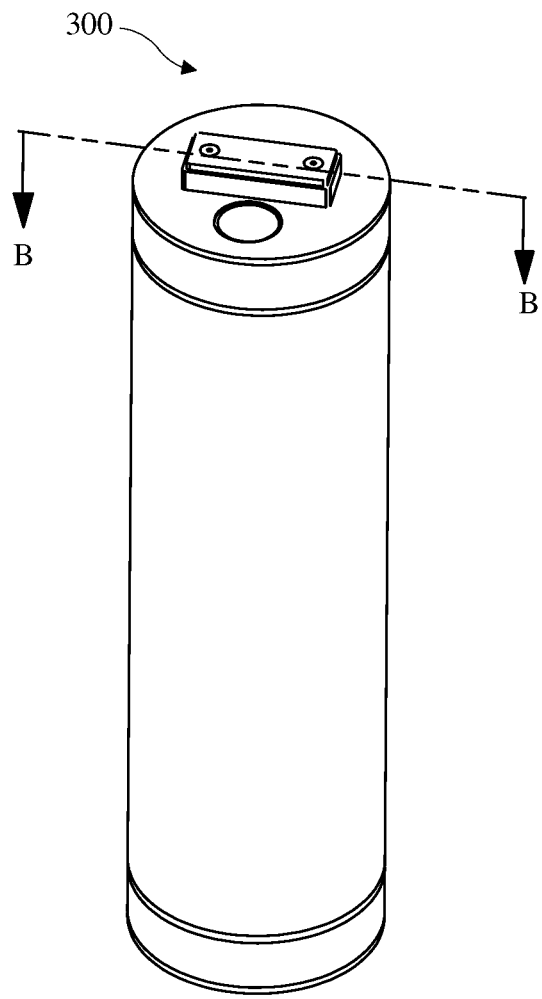
FIG. 5 is a schematic structural view of an energy-storage apparatus in an embodiment of the disclosure.
Figure 6:
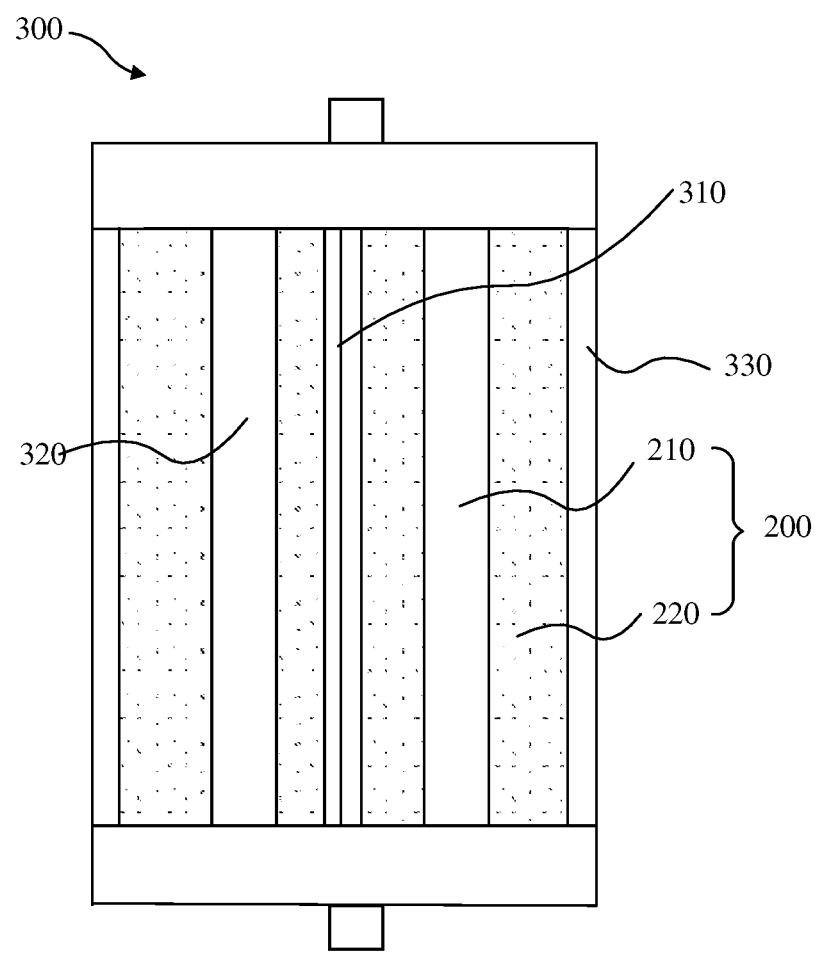
FIG. 6 is a schematic cross-sectional structural view of an energy-storage apparatus in an embodiment of the disclosure, taken along line B-B in FIG. 5.

Referring to FIG. 5 and FIG. 6, an energy-storage apparatus 300 is provided in embodiments of the fourth aspect of the disclosure. The energy-storage apparatus 300 includes electrolyte 330, a positive electrode sheet 320, a separator 310, and the negative electrode sheet 200 as described in embodiments of the disclosure. The positive electrode sheet 320 is at least partially immersed in the electrolyte 330. The separator 310 is located at one side of the positive electrode sheet 320 and at least partially immersed in the electrolyte 330. The negative electrode sheet 200 is disposed at one side of the separator 310 away from the positive electrode sheet 320 and at least partially immersed in the electrolyte 330.

The energy-storage apparatus 300 in embodiments of the disclosure may be, but is not limited to, a lithium-ion secondary energy-storage apparatus 300, a lithium-ion primary energy-storage apparatus 300, a sodium-ion energy-storage apparatus 300, a lithium-sulfur energy-storage apparatus 300, and the like.

It may be understood that the energy-storage apparatus 300 may be, but is not limited to, a battery cell, a battery module, a battery pack, and the like.

Optionally, the separator 310 may be, but is not limited to, at least one of a polypropylene (PP) film or a polyethylene (PE) film.

The following further describes the disclosure with reference to embodiments. It may be understood that the embodiments provided herein are merely an aid to understanding the disclosure and may not be considered a specific limitation to the disclosure.

For ease of understanding, the following embodiments are set forth in the disclosure. It may be obvious to those of ordinary skill in the art that the embodiments are carried out in accordance with conventional conditions, unless specific conditions are indicated.

Embodiment 1

1) Preparation of the negative electrode particle 100

At the first step, the precursor, e.g., a coconut shell, is pulverized into a powder with a size of 8 μm and collected for spare.

At the second step, the precursor, e.g., the coconut shell, after pulverization is subject to chemical de-dusting, and then is washed and dried for spare, where a de-dusting reagent is a mixture of 5 M/L hydrochloric acid and 20% hydrofluoric acid.

At the third step, the precursor, e.g., a coconut shell powder, after de-dusting is mixed with potassium hydroxide according to a ratio of 1:1 and loaded into a crucible. The crucible with the precursor and the potassium hydroxide is put into a tube furnace, and the precursor and the potassium hydroxide are heated up to 650° C. at 0.5° C./min under the effect of a protective atmosphere and kept warm for 2 h. After heat preservation, the precursor and the potassium hydroxide are cooled for spare.

At the fourth step, a cooled mixture of the precursor, e.g., the coconut shell powder, and the potassium hydroxide is poured into pure water, and washed and filtered several times to obtain a pre-carbonized coconut shell powder. The pre-carbonized coconut shell powder is dried for spare.

At the fifth step, a protective gas is passed into the tube furnace, and the precursor, e.g., the coconut shell powder, after pre-carbonization is heated up to 1400° C. at 2° C./min and kept warm for 6 h. After heat preservation, the precursor, e.g., the coconut shell powder, is cooled down to a room temperature, so that the negative electrode particle 100, e.g., hard carbon, is obtained. Parameters of the hard carbon, such as a pore volume of a closed pore 101 and a true density, are illustrated in Table 2.

2) Preparation of the negative electrode sheet 200: the negative electrode particle 100, e.g., hard carbon, conductive carbon, e.g., super P (SP), and a binder, e.g., carboxymethyl cellulose (CMC) are dispersed in deionized water according to a mass ratio of 90:5:5 and mixed uniformly to obtain a negative electrode slurry. The negative electrode slurry is coated on the negative electrode current collector 210, e.g., a copper foil, and dried. A coating weight of the negative electrode active substance layer 220 is 3 mg/cm$^2$. After rolling and punching, the negative electrode sheet 200 is obtained.

3) Preparation of the separator 310: a PE film having a thickness of 16 μm is used as the separator 310.

4) Preparation of the electrolyte: ethylene carbonate (EC) and diethyl carbonate (DEC) are mixed according to a volume ratio of 1:1 to obtain a mixed solvent, to which a dry sodium salt, e.g., sodium hexafluorophosphate (NaPF$_6$), is added to form the electrolyte with a concentration of 1 mol/L.

5) Preparation of the energy-storage apparatus 300: a sodium sheet is provided. The sodium sheet, the separator 310, and the negative electrode sheet 200 are sequentially placed into a housing of a button cell at a negative-electrode side, so that the separator 310 is located between the sodium sheet and the negative electrode sheet 200 for separation. 2 drops of the electrolyte are dropped, and then a housing of the button cell at a positive-electrode side is assembled, to obtain the energy-storage apparatus 300 described in embodiment 1.

Embodiment 2 and Embodiment 3

1) Preparation of the negative electrode particle 100

At the first step, the precursor, e.g., a coconut shell, is pulverized into a powder with a size of 8 μm and collected for spare.

At the second step, the precursor, e.g., the coconut shell, after pulverization is subject to chemical de-dusting, and then is washed and dried for spare, where a de-dusting reagent is a mixture of 5 M/L hydrochloric acid and 20% hydrofluoric acid.

At the third step, the precursor, e.g., a coconut shell powder, after de-dusting is mixed with potassium hydroxide according to a ratio of 1:1 and loaded into a crucible. The crucible with the precursor and the potassium hydroxide is put into a tube furnace, and the precursor and the potassium hydroxide are heated up to 650° ° C. at a certain first heating rate R1 under the effect of a protective atmosphere and kept warm for 2 h. After heat preservation, the precursor and the potassium hydroxide are cooled for spare. The first heating rate R1 is specifically illustrated in Table 1.

At the fourth step, a cooled mixture of the precursor, e.g., the coconut shell powder, and the potassium hydroxide is poured into pure water, and washed and filtered several times to obtain a pre-carbonized coconut shell powder. The pre-carbonized coconut shell powder is dried for spare.

At the fifth step, a protective gas is passed into the tube furnace, and the precursor, e.g., the coconut shell powder, after pre-carbonization is heated up to 1400° C. at 2° C./min and kept warm for 6 h. After heat preservation, the precursor, e.g., the coconut shell powder, is cooled down to a room temperature, so that the negative electrode particle 100, e.g., hard carbon, is obtained. Parameters of the hard carbon, such as a pore volume of a closed pore 101 and a true density, are illustrated in Table 2.

2) Preparation of the negative electrode sheet 200 is the same as preparation of the negative electrode sheet 200 in embodiment 1.

3) Preparation of the separator 310 is the same as preparation of the separator 310 in embodiment 1.

4) Preparation of the electrolyte is the same as preparation of the electrolyte in embodiment 1.

5) Preparation of the energy-storage apparatus 300 is the same as preparation of the energy-storage apparatus 300 in embodiment 1.

Embodiment 4 and Embodiment 5

1) Preparation of the negative electrode particle 100

At the first step, the precursor, e.g., a coconut shell, is pulverized into a powder with a size of 8 µm and collected for spare.

At the second step, the precursor, e.g., the coconut shell, after pulverization is subject to chemical de-dusting, and then is washed and dried for spare, where a de-dusting reagent is a mixture of 5 M/L hydrochloric acid and 20% hydrofluoric acid.

At the third step, the precursor, e.g., a coconut shell powder, after de-dusting is mixed with potassium hydroxide according to a ratio of 1:1 and loaded into a crucible. The crucible with the precursor and the potassium hydroxide is put into a tube furnace, and the precursor and the potassium hydroxide are heated up to 650° C. at 0.5° C./min under the effect of a protective atmosphere and kept warm for 2 h. After heat preservation, the precursor and the potassium hydroxide are cooled for spare.

At the fourth step, a cooled mixture of the precursor, e.g., the coconut shell powder, and the potassium hydroxide is poured into pure water, and washed and filtered several times to obtain a pre-carbonized coconut shell powder. The pre-carbonized coconut shell powder is dried for spare.

At the fifth step, a protective gas is passed into the tube furnace, and the precursor, e.g., the coconut shell powder, after pre-carbonization is heated up to 1400° C. at a certain second heating rate R2 and kept warm for 6 h. After heat preservation, the precursor, e.g., the coconut shell powder, is cooled down to a room temperature, so that the negative electrode particle 100, e.g., hard carbon, is obtained. The second heating rate R2 is specifically illustrated in Table 1, and parameters of the hard carbon, such as a pore volume of a closed pore 101 and a true density, are illustrated in Table 2.

2) Preparation of the negative electrode sheet 200 is the same as preparation of the negative electrode sheet 200 in embodiment 1.

3) Preparation of the separator 310 is the same as preparation of the separator 310 in embodiment 1.

4) Preparation of the electrolyte is the same as preparation of the electrolyte in embodiment 1.

5) Preparation of the energy-storage apparatus 300 is the same as preparation of the energy-storage apparatus 300 in embodiment 1.

Embodiment 6 and Embodiment 7

1) Preparation of the negative electrode particle 100

At the first step, the precursor, e.g., a coconut shell, is pulverized into a powder with a size of 8 µm and collected for spare.

At the second step, the precursor, e.g., the coconut shell, after pulverization is subject to chemical de-dusting, and then is washed and dried for spare, where a de-dusting reagent is a mixture of 5 M/L hydrochloric acid and 20% hydrofluoric acid.

At the third step, the precursor, e.g., a coconut shell powder, after de-dusting is mixed with potassium hydroxide according to a ratio of 1:1 and loaded into a crucible. The crucible with the precursor and the potassium hydroxide is put into a tube furnace, and the precursor and the potassium hydroxide are heated up to 650° C. at 0.5° C./min under the effect of a protective atmosphere and kept warm for 2 h. After heat preservation, the precursor and the potassium hydroxide are cooled for spare.

At the fourth step, a cooled mixture of the precursor, e.g., the coconut shell powder, and the potassium hydroxide is poured into pure water, and washed and filtered several times to obtain a pre-carbonized coconut shell powder. The pre-carbonized coconut shell powder is dried for spare.

At the fifth step, a protective gas is passed into the tube furnace, and the precursor, e.g., the coconut shell powder, after pre-carbonization is heated up to the second temperature T2 at 2° C./min and kept warm for 6 h. After heat preservation, the precursor, e.g., the coconut shell powder, is cooled down to a room temperature, so that the negative electrode particle 100, e.g., hard carbon, is obtained. The second temperature T2 is specifically illustrated in Table 1, and parameters of the hard carbon, such as a pore volume of a closed pore 101 and a true density, are illustrated in Table 2.

2) Preparation of the negative electrode sheet 200 is the same as preparation of the negative electrode sheet 200 in embodiment 1.

3) Preparation of the separator 310 is the same as preparation of the separator 310 in embodiment 1.

4) Preparation of the electrolyte is the same as preparation of the electrolyte in embodiment 1.

5) Preparation of the energy-storage apparatus 300 is the same as preparation of the energy-storage apparatus 300 in embodiment 1.

Embodiment 8

1) Preparation of the negative electrode particle 100

At the first step, the precursor, e.g., a coconut shell, is pulverized into a powder with a size of 8 µm and collected for spare.

At the second step, the precursor, e.g., the coconut shell, after pulverization is subject to chemical de-dusting, and then is washed and dried for spare, where a de-dusting reagent is a mixture of 5 M/L hydrochloric acid and 20% hydrofluoric acid.

At the third step, the precursor, e.g., a coconut shell powder, after de-dusting is mixed with potassium hydroxide according to a ratio of 1:1 and loaded into a crucible. The crucible with the precursor and the potassium hydroxide is put into a tube furnace, and the precursor and the potassium hydroxide are heated up to 650° ° C. at 0.5° C./min under the effect of a protective atmosphere and kept warm for 2 h. After heat preservation, the precursor and the potassium hydroxide are cooled for spare.

At the fourth step, a cooled mixture of the precursor, e.g., the coconut shell powder, and the potassium hydroxide is poured into pure water, and washed and filtered several times to obtain a pre-carbonized coconut shell powder. The pre-carbonized coconut shell powder is dried for spare.

At the fifth step, a protective gas is passed into the tube furnace, and the precursor, e.g., the coconut shell powder, after pre-carbonization is heated up to 1000° C. at 2° C./min, acetylene is passed into the tube furnace according to a certain proportion, and the precursor is kept warm for 2 h. After heat preservation, the acetylene is stopped to be passed, the precursor, e.g., the coconut shell powder, is cooled down to a room temperature under the effect of the protective atmosphere, so that the negative electrode particle 100, e.g., hard carbon, is obtained. Parameters of the hard carbon, such as a pore volume of a closed pore 101 and a true density, are illustrated in Table 2.

2) Preparation of the negative electrode sheet 200 is the same as preparation of the negative electrode sheet 200 in embodiment 1.

3) Preparation of the separator 310 is the same as preparation of the separator 310 in embodiment 1.
4) Preparation of the electrolyte is the same as preparation of the electrolyte in embodiment 1.
5) Preparation of the energy-storage apparatus 300 is the same as preparation of the energy-storage apparatus 300 in embodiment 1.

Comparative Embodiment 1

1) Preparation of the negative electrode particle 100

At the first step, the precursor, e.g., a coconut shell, is pulverized into a powder with a size of 8 μm and collected for spare.

At the second step, the precursor, e.g., the coconut shell, after pulverization is subject to chemical de-dusting, and then is washed and dried for spare, where a de-dusting reagent is a mixture of 5 M/L hydrochloric acid and 20% hydrofluoric acid.

At the third step, the precursor, e.g., a coconut shell powder, after de-dusting is loaded into a crucible, and the crucible with the precursor is put into a tube furnace. The precursor is heated up to 650° ° C. at 6° C./min under the effect of a protective atmosphere and kept warm for 2 h. After heat preservation, the precursor is heated up to 1400° ° C. at 2° C./min and kept warm for 6 h. After heat preservation, the precursor, e.g., the coconut shell powder, is cooled down to a room temperature, so that the negative electrode particle 100, e.g., hard carbon, is obtained. Parameters of the hard carbon, such as a pore volume of a closed pore 101 and a true density, are illustrated in Table 2.

2) Preparation of the negative electrode sheet 200 is the same as preparation of the negative electrode sheet 200 in embodiment 1.
3) Preparation of the separator 310 is the same as preparation of the separator 310 in embodiment 1.
4) Preparation of the electrolyte is the same as preparation of the electrolyte in embodiment 1.
5) Preparation of the energy-storage apparatus 300 is the same as preparation of the energy-storage apparatus 300 in embodiment 1.

Comparative Embodiment 2

1) Preparation of the negative electrode particle 100

At the first step, the precursor, e.g., a coconut shell, is pulverized into a powder with a size of 8 μm and collected for spare.

At the second step, the precursor, e.g., the coconut shell, after pulverization is subject to chemical de-dusting, and then is washed and dried for spare, where a de-dusting reagent is a mixture of 5 M/L hydrochloric acid and 20% hydrofluoric acid.

At the third step, the precursor, e.g., a coconut shell powder, after de-dusting is loaded into a crucible, and the crucible with the precursor is put into a tube furnace. The precursor is heated up to 1400° C. at 5° C./min and kept warm for 6 h. After heat preservation, the precursor, e.g., the coconut shell powder, is cooled down to a room temperature, so that the negative electrode particle 100, e.g., hard carbon, is obtained. Parameters of the hard carbon, such as a pore volume of a closed pore 101 and a true density, are illustrated in Table 2.

2) Preparation of the negative electrode sheet 200 is the same as preparation of the negative electrode sheet 200 in embodiment 1.

3) Preparation of the separator 310 is the same as preparation of the separator 310 in embodiment 1. 4) Preparation of the electrolyte is the same as preparation of the electrolyte in embodiment 1. 5) Preparation of the energy-storage apparatus 300 is the same as preparation of the energy-storage apparatus 300 in embodiment 1.

Comparative Embodiment 3

1) Preparation of the negative electrode particle 100

At the first step, the precursor, e.g., a coconut shell, is pulverized into a powder with a size of 8 μm and collected for spare.

At the second step, the precursor, e.g., the coconut shell, after pulverization is subject to chemical de-dusting, and then is washed and dried for spare, where a de-dusting reagent is a mixture of 5 M/L hydrochloric acid and 20% hydrofluoric acid.

At the third step, the precursor, e.g., a coconut shell powder, after de-dusting is mixed with potassium hydroxide according to a ratio of 1:1 and loaded into a crucible. The crucible with the precursor and the potassium hydroxide is put into a tube furnace, and the precursor and the potassium hydroxide are heated up to 300° C. at 0.5° C./min under the effect of a protective atmosphere and kept warm for 2 h. After heat preservation, the precursor and the potassium hydroxide are cooled for spare.

At the fourth step, a cooled mixture of the precursor, e.g., the coconut shell powder, and the potassium hydroxide is poured into pure water, and washed and filtered several times to obtain a pre-carbonized coconut shell powder. The pre-carbonized coconut shell powder is dried for spare.

At the fifth step, a protective gas is passed into the tube furnace, and the precursor, e.g., the coconut shell powder, after pre-carbonization is heated up to 1400° C. at 5° C./min and kept warm for 6 h. After heat preservation, the precursor, e.g., the coconut shell powder, is cooled down to a room temperature, so that the negative electrode particle 100, e.g., hard carbon, is obtained. Parameters of the hard carbon, such as a pore volume of a closed pore 101 and a true density, are illustrated in Table 2.

2) Preparation of the negative electrode sheet 200 is the same as preparation of the negative electrode sheet 200 in embodiment 1.
3) Preparation of the separator 310 is the same as preparation of the separator 310 in embodiment 1.
4) Preparation of the electrolyte is the same as preparation of the electrolyte in embodiment 1.
5) Preparation of the energy-storage apparatus 300 is the same as preparation of the energy-storage apparatus 300 in embodiment 1.

Comparative Embodiment 4

1) Preparation of the negative electrode particle 100

At the first step, the precursor, e.g., a coconut shell, is pulverized into a powder with a size of 8 μm and collected for spare.

At the second step, the precursor, e.g., the coconut shell, after pulverization is subject to chemical de-dusting, and then is washed and dried for spare, where a de-dusting reagent is a mixture of 5 M/L hydrochloric acid and 20% hydrofluoric acid.

At the third step, the precursor, e.g., a coconut shell powder, after de-dusting is loaded into a crucible, and the crucible with the precursor is put into a tube furnace. The precursor is heated up to 650° C. at 0.5° C./min under the effect of a protective atmosphere and kept warm for 2 h. After heat preservation, the precursor is heated up to 1100° C. at 2° C./min and kept warm for 6 h. After heat preservation, the precursor, e.g., the coconut shell powder, is cooled down to a room temperature, so that the negative electrode particle 100, e.g., hard carbon, is obtained. Parameters of the hard carbon, such as a pore volume of a closed pore 101 and a true density, are illustrated in Table 2.

2) Preparation of the negative electrode sheet 200 is the same as preparation of the negative electrode sheet 200 in embodiment 1.
3) Preparation of the separator 310 is the same as preparation of the separator 310 in embodiment 1.
4) Preparation of the electrolyte is the same as preparation of the electrolyte in embodiment 1.
5) Preparation of the energy-storage apparatus 300 is the same as preparation of the energy-storage apparatus 300 in embodiment 1.

Performance Testing

1) The pore volume of the closed pore 101 of the negative electrode particle 100 is equal to $1/\rho_1 - 1/\rho_2$.
2) The pore diameter of the closed pore 101 of the negative electrode particle 100: the following parameters are obtained by testing with a small angle X-ray scatterometer (SAXS). The pore diameter of the closed pore 101 is equal to $$|\Delta\rho|^2 \int_0^\infty |F(Q, r)|^2 V^2(r) NP(r) dr,$$

where $\Delta\rho$ represents a contrast, $F(Q, r)$ represents a scattering shape factor, $V'(r)$ represents a volume of the negative electrode particle 100, N represents the total number of negative electrode particles 100, and $P(r)$ represents a probability that a negative electrode particle 100 with a size of r occurs.

3) The specific surface area of the closed pore 101 of the negative electrode particle 100: with the SAXS, a scattering vector q and a scattering intensity I(q) are obtained, where $$q = \frac{4\pi \sin 2\theta}{\lambda},$$

$2\theta$ represents a scattering angle, and $\lambda$ represents a X-ray wavelength, and where $K = \lim_{q \to \infty} q^4 I(q)$, K represents a porod constant. The specific surface area S1 of the closed pore 101 satisfies:

$$S1 = \frac{\pi A \lim_{q \to \infty} \{q^4 I(q)\}}{\rho_1 \int_0^\infty q^2 I(q) dq},$$

where A represents a porosity of the negative electrode particle 100.

4) The pore volume of the open pore 102 of the negative electrode particle 100: samples after drying and degassing treatment are placed into liquid nitrogen, different test pressures are adjusted to measure, with a physical adsorption analyzer, e.g., ASAP2460, the amount of nitrogen adsorbed by the samples, respectively, and adsorption and desorption isotherms are plotted. The pore volume of the open pore 102 is obtained by determining a shape of the open pore 102 according to a shape of a hysteresis loop.

5) The specific surface area of the open pore 102 of the negative electrode particle 100: samples after drying and degassing treatment are placed into liquid nitrogen, and different test pressures are adjusted to measure, with a physical adsorption analyzer, e.g., ASAP2460, the amount of nitrogen adsorbed by the samples, respectively, and the specific surface area of the open pore 102 is obtained.

6) The true density of the negative electrode particle 100: the true density is tested according to a true-density liquid analysis method with a fully-automatic true-density analyzer manufactured by Quantachrome in USA, e.g., ultrapycnometer (ultrapyc) 1200e.

7) The rate performance of the energy-storage apparatus 300: the energy-storage apparatus 300 obtained in the above embodiments is subject to a rate test on a charge-discharge meter. Cycle charging and discharging three times at a test temperature of 25° C. and at a rate of 0.5 C (i.e., both a charging rate and a discharging rate are 0.5 C), and record a charging capacity at the third time as C1. Discharge the device at a rate of 0.1 C, charge the device at a rate of 0.1 C, and record a charging capacity as C2. A capacity retention rate at 0.5 C/0.1 C is C2/C1.

8) The cycling performance of the energy-storage apparatus 300: the energy-storage apparatus 300 obtained in the above embodiments is subject to a charge-discharge cycling test on a charge-discharge meter. Calculate a capacity retention rate after cycling at a test temperature of 25° C., at a cycling rate of 0.2 C (i.e., both a charging rate and a discharging rate are 0.2 C), and at a charging voltage ranging from 5 mV to 2V. A formula for calculating the capacity retention rate is: capacity retention rate after the nth cycling=(charging capacity after the nth cycling/maximum value of charging capacity during cycling)×100%.

It is to be understood that the term "the number of cycles" in the disclosure refers to the number of times that the energy-storage apparatus 300 is charged at a preset rate and discharged at a preset rate. Charging and discharging completed by the energy-storage apparatus 300 is called a cycle. The capacity retention rate after 50 times of cycling at 0.2 C/0.2 C refers to a capacity retention rate of the energy-storage apparatus 300 after 50 times of charging and discharging performed at a charging rate of 0.2 C and a discharging rate of 0.2 C and at a test temperature of 25° C.

The first heating rates, the first temperatures, etc. in described embodiment 1 to embodiment 8 and comparative embodiment 1 to comparative embodiment 4 are illustrated in Table 1.

TABLE 1

| Embodiment | R1 (° C./min) | T1 (° C.) | R2 (° C./min) | T2 (° C.) | T3 (° C.) |
|---|---|---|---|---|---|
| Embodiment 1 | 0.5 | 650 | 2 | 1400 | / |
| Embodiment 2 | 2 | 650 | 2 | 1400 | / |
| Embodiment 3 | 3 | 650 | 2 | 1400 | / |
| Embodiment 4 | 0.5 | 650 | 3 | 1400 | / |
| Embodiment 5 | 0.5 | 650 | 5 | 1400 | / |
| Embodiment 6 | 0.5 | 650 | 2 | 1300 | / |
| Embodiment 7 | 0.5 | 650 | 2 | 1500 | / |
| Embodiment 8 | 0.5 | 650 | 2 | 1000 | 1000 |

TABLE 1-continued

| Embodiment | R1 (° C./min) | T1 (° C.) | R2 (° C./min) | T2 (° C.) | T3 (° C.) |
|---|---|---|---|---|---|
| Comparative embodiment 1 | 6 | 650 | 2 | 1400 | / |
| Comparative embodiment 2 | / | / | 5 | 1400 | / |
| Comparative embodiment 3 | 0.5 | 300 | 5 | 1400 | / |
| Comparative embodiment 4 | 0.5 | 650 | 2 | 1100 | / |

TABLE 2

| Embodiment | C1 (cm³/g) | C2 (cm³/g) | D1 (nm) | C1/C2 | S1 (m²/g) | S2 (m²/g) | S1/S2 | $\rho_1$ (g/cm³) |
|---|---|---|---|---|---|---|---|---|
| Embodiment 1 | 0.0575 | 0.0078 | 1.2 | 7.37 | 192 | 2.2 | 87.27 | 2 |
| Embodiment 2 | 0.0729 | 0.0091 | 1.6 | 8.01 | 182 | 4 | 45.5 | 1.94 |
| Embodiment 3 | 0.0922 | 0.0098 | 1.8 | 9.41 | 205 | 4.3 | 47.7 | 1.87 |
| Embodiment 4 | 0.0651 | 0.008 | 1.3 | 8.14 | 200 | 2.5 | 80 | 1.97 |
| Embodiment 5 | 0.0677 | 0.0081 | 1.25 | 8.36 | 217 | 2.6 | 83.5 | 1.96 |
| Embodiment 6 | 0.0625 | 0.0085 | 1.1 | 7.35 | 227 | 3.7 | 61.35 | 1.98 |
| Embodiment 7 | 0.0501 | 0.0077 | 1 | 6.51 | 200 | 2 | 100 | 2.03 |
| Embodiment 8 | 0.0783 | 0.0076 | 1 | 10.3 | 313 | 1.8 | 173.89 | 1.92 |
| Comparative embodiment 1 | 0.139 | 0.0107 | 2.6 | 12.99 | 213 | 6.9 | 30.87 | 1.72 |
| Comparative embodiment 2 | 0.135 | 0.0105 | 2.4 | 12.86 | 226 | 6.5 | 34.77 | 1.73 |
| Comparative embodiment 3 | 0.132 | 0.0104 | 2.2 | 12.69 | 240 | 6.4 | 37.5 | 1.74 |
| Comparative embodiment 4 | 0.07 | 0.0127 | 1.9 | 5.51 | 148 | 8.4 | 17.6 | 1.95 |

The test data of the energy-storage apparatus 300 is illustrated in Table 3.

TABLE 3

| Embodiment | Gram capacity (mAh/g) | Initial efficiency (%) | capacity retention rate at 0.5 C/0.1 C (%) | capacity retention rate after 50 times of cycling at 0.2 C/0.2 C (%) |
|---|---|---|---|---|
| Embodiment 1 | 302 | 89.2 | 87.1 | 91 |
| Embodiment 2 | 288 | 88.4 | 88.2 | 87 |
| Embodiment 3 | 281 | 87.7 | 88.6 | 87 |
| Embodiment 4 | 305 | 89.5 | 87.3 | 90 |
| Embodiment 5 | 309 | 89.7 | 87.5 | 90 |
| Embodiment 6 | 283 | 88.0 | 87.8 | 88 |
| Embodiment 7 | 276 | 88.1 | 87 | 92 |
| Embodiment 8 | 316 | 90.3 | 91.2 | 95 |
| Comparative embodiment 1 | 262 | 86.5 | 89.7 | 83 |
| Comparative embodiment 2 | 267 | 86.1 | 89.5 | 85 |
| Comparative embodiment 3 | 274 | 86.7 | 89.1 | 86 |
| Comparative embodiment 4 | 258 | 85.4 | 89.4 | 80 |

From the data in Table 2, in comparative embodiment 1, the pore volume of the closed pore 101 of the negative electrode particle 100 is 0.139 cm³/g, the ratio of the pore volume of the closed pore 101 to the pore volume of the open pore 102 is 12.99, the pore diameter of the closed pore 101 is 2.6 nm, the gram capacity of the negative electrode particle 100 is only 262 mAh/g, and the initial efficiency is 86.5%, where the gram capacity and the initial efficiency in comparative embodiment 1 are much lower than the gram capacity and the initial efficiency in embodiment 1. This is due to the fact that there is no soluble salt during pre-carbonization in embodiment 1, the first heating rate is relatively fast, the volatile components are volatilized relatively fast, and pores obtained have relatively large pore diameters. In comparative embodiment 1, the closed pore 101 has a too large pore volume and a relatively large pore diameter, so that binding energy of the active ions becomes relatively large, which is unfavorable to embedding and dis-embedding of the active ions, and the ratio of the pore volume of the closed pore 101 to the pore volume of the open pore 102 is relatively large, which may affect immersion of the negative electrode particle 100 by the electrolyte and lead to a limit to the ion conduction channel, and thus the gram capacity of the negative electrode particle 100 may be reduced.

In comparative embodiment 2, the pore volume of the closed pore 101 of the negative electrode particle 100 is 0.135 cm³/g, the ratio of the pore volume of the closed pore 101 to the pore volume of the open pore 102 is 12.86, the pore diameter of the closed pore 101 is 2.4 nm, the gram capacity of the negative electrode particle 100 is only 267 mAh/g, and the initial efficiency is 86.1%, where the gram capacity and the initial efficiency in comparative embodiment 2 are much lower than the gram capacity and the initial efficiency in embodiment 1. This is due to the fact that there is no pre-carbonization process in comparative embodiment 2, and a relatively large second heating rate is directly used for carbonization, which may lead to too fast volatilization of volatile components of the precursor, resulting in a relatively large pore diameter. In comparative embodiment 2, the closed pore 101 has a too large pore volume and a relatively large pore diameter, so that binding energy of the active ions becomes relatively large, which is unfavorable to embedding and dis-embedding of the active ions, and the ratio of the pore volume of the closed pore 101 to the pore volume of the open pore 102 is relatively large, which may affect immersion of the negative electrode particle 100 by the electrolyte and lead to a limit to the ion conduction channel, and thus the gram capacity of the negative electrode particle 100 may be reduced.

In comparative embodiment 3, the pore volume of the closed pore 101 of the negative electrode particle 100 is 0.132 cm³/g, the ratio of the pore volume of the closed pore 101 to the pore volume of the open pore 102 is 12.69, the pore diameter of the closed pore 101 is 2.2 nm, the gram capacity of the negative electrode particle 100 is only 274 mAh/g, and the initial efficiency is 86.7%, where the gram capacity and the initial efficiency in comparative embodiment 3 are much lower than the gram capacity and the initial efficiency in embodiment 1. This is due to the fact that the first temperature in comparative embodiment 3 is relatively low, the soluble salt is not melted, only part of the volatile components is volatilized during pre-carbonization to form some pores, and the soluble salt is not melted and is unable to occupy the pore. Furthermore, the second heating rate is relatively large, resulting in relatively fast volatilization of the volatile components during carbonization, and thus the closed pore 101 obtained finally has a relatively large pore diameter, so that binding energy of the active ions becomes relatively large, which is unfavorable to embedding and dis-embedding of the active ions, and thus the gram capacity of the negative electrode particle 100 is reduced.

In embodiment 2, the pore diameter of the closed pore 101 of the negative electrode particle 100 is 1.6 nm, the ratio of the specific surface area of the closed pore 101 to the specific surface area of the negative electrode particle 100 is 45.5, the gram capacity of the negative electrode particle 100 is 288 mAh/g, and the initial efficiency is 88.4%, where the gram capacity and the initial efficiency in embodiment 2 are lower than the gram capacity and the initial efficiency in embodiment 1. In embodiment 3, the pore diameter of the closed pore 101 of the negative electrode particle 100 is 1.8 nm, the ratio of the specific surface area of the closed pore 101 to the specific surface area of the negative electrode particle 100 is 47.7, the gram capacity of the negative electrode particle 100 is 281 mAh/g and the initial efficiency is 87.7%, where the gram capacity and the initial efficiency in embodiment 3 are slightly lower than the gram capacity and the initial efficiency in embodiment 2. This is due to the fact that the closed pore 101 obtained has a relatively large pore diameter with the increase in the first heating rate, so that binding energy of the active ions becomes relatively large, which is unfavorable to embedding and dis-embedding of the active ions, thereby reducing the gram capacity and the initial efficiency of the negative electrode particle 100.

In embodiment 4, the pore volume of the closed pore 101 of the negative electrode particle 100 is 0.0651 $cm^3/g$, the ratio of the pore volume of the closed pore 101 to the pore volume of the open pore 102 is 8.14, the gram capacity of the negative electrode particle 100 is 305 mAh/g, and the capacity retention rate after 50 times of cycling at 0.2 C/0.2 C is 90%, where the gram capacity in embodiment 4 is slightly higher than the gram capacity in embodiment 1. This is due to the fact that the second heating rate in embodiment 4 is relatively large, the degree of disorder in the negative electrode particle 100 is intensified, and a tendency that microcrystals are combined to form pores becomes relatively great, thereby increasing internal micro-pores and improving the gram capacity of the negative electrode particle 100. In embodiment 5, the pore volume of the closed pore 101 of the negative electrode particle 100 is 0.0677 $cm^3/g$, the ratio of the pore volume of the closed pore 101 to the pore volume of the open pore 102 is 8.36, the gram capacity of the negative electrode particle 100 is 309 mAh/g, and the capacity retention rate after 50 times of cycling at 0.2 C/0.2 C is 90%, where the capacity retention rate in embodiment 5 is slightly lower than the cycling capacity retention rate in embodiment 4. This is due to the fact that the degree of disorder in the negative electrode particle 100 continues to increase as the second heating rate continues to increase, and thus the gram capacity of the negative electrode particle 100 is improved.

In embodiment 6, the pore volume of the closed pore 101 of the negative electrode particle 100 is 0.0625 $cm^3/g$, the ratio of the pore volume of the closed pore 101 to the pore volume of the open pore 102 is 7.35, the gram capacity of the negative electrode particle 100 is 283 mAh/g, and the initial efficiency of the negative electrode particle 100 is 88%, where the gram capacity and the initial efficiency in embodiment 6 are slightly lower than the gram capacity and the initial efficiency in embodiment 1. This is due to the fact that the second temperature in embodiment 6 is slightly low, so that defects of the negative electrode particle 100 are increased, and thus the initial efficiency and the gram capacity of the negative electrode particle 100 are reduced. In embodiment 7, the pore volume of the closed pore 101 of the negative electrode particle 100 is 0.0501 $cm^3/g$, the ratio of the pore volume of the closed pore 101 to the pore volume of the open pore 102 is 6.51, and the gram capacity of the negative electrode particle 100 is 276 mAh/g, where the gram capacity in embodiment 7 is slightly lower than the gram capacity in embodiment 6. This is due to the fact that the second temperature in embodiment 7 is relatively high, and the layer spacing of the negative electrode particle 100 becomes narrow with a continuous increase in the second temperature, which is unfavorable for storing active ions, resulting in a reduction in the gram capacity of the negative electrode particle 100.

In embodiment 8, the pore volume of the closed pore 101 of the negative electrode particle 100 is 0.0783 $cm^3/g$, the ratio of the pore volume of the closed pores 101 to the pore volume of the open pore 102 is 10.3, the gram capacity of the negative electrode particle 100 is 316 mAh/g, and the initial efficiency of the negative electrode particle 100 is 90.3%, where the gram capacity and the initial efficiency in embodiment 8 are significantly higher than the gram capacity and the initial efficiency in embodiment 1. This is due to that chemical vapor deposition is additionally used to process the closed pore 101 in embodiment 8, the closed pore 101 of the negative electrode particle 100 is increased, and the ratio of the pore volume of the closed pore 101 to the pore volume of the open pore 102 is increased, thereby avoiding serious side reactions between the negative electrode particle 100 and the electrolyte. Meanwhile, the negative electrode particle 100 has many storage sites for active ions, so that the negative electrode particle 100 has a relatively high gram capacity and relatively high initial efficiency. Furthermore, the negative electrode particle 100 has a small specific surface area but many closed pores 101 because the closed pore 101 is processed through chemical vapor deposition and the carbon layer is deposited on the surface, and thus the rate performance is relatively good.

The term "implementation" or "embodiment" referred to herein means that a particular feature, structure, or feature described in conjunction with the embodiment or embodiment may be contained in at least one embodiment of the disclosure. Phrases appearing in various places in the specification does not necessarily refer to the same embodiment, nor does it refer to an independent or alternative embodiment that is mutually exclusive with other embodiments. It is explicitly and implicitly understood by those of ordinary skill in the art that an embodiment described herein may be combined with other embodiments. In addition, it can be further understood that the features, structures, or characteristics described in embodiments of the disclosure may be combined arbitrarily without contradiction therebetween to form another embodiment that does not depart from the spirit and scope of the technical solutions of the disclosure.

Finally, it should be noted that the foregoing embodiments are merely intended to illustrate but not limit the technical solutions of the disclosure. Although the disclosure is described in detail with reference to the foregoing optimal embodiments, those of ordinary skill in the art should understand that modifications or equivalent replacements can be made to the technical solutions of the disclosure without departing from the spirit and scope of the technical solutions of the disclosure.

What is claimed is:

1. A negative electrode particle, wherein the negative electrode particle defines a closed pore located inside the negative electrode particle and an open pore located on a surface of the negative electrode particle, and a ratio of a pore volume C1 of the closed pore to a pore volume C2 of the open pore satisfies: $6 \leq C1/C2 \leq 11$, and the pore volume C1 of the closed pore satisfies: $0.03$ cm$^3$/g$\leq C1 \leq 0.12$ cm$^3$/g.

2. The negative electrode particle of claim 1, wherein the pore volume C2 of the open pore satisfies: $0.005$ cm$^3$/g$\leq C2 \leq 0.01$ cm$^3$/g.

3. The negative electrode particle of claim 1, wherein an average pore diameter D1 of the closed pore of the negative electrode particle satisfies: $0.8$ nm$\leq D1 \leq 2.0$ nm.

4. The negative electrode particle of claim 1, wherein a ratio of a specific surface area S1 of the closed pore of the negative electrode particle to a specific surface area S of the negative electrode particle satisfies: $40 \leq S1/S \leq 200$.

5. The negative electrode particle of claim 4, wherein the specific surface area S1 of the closed pore satisfies: $40$ m$^2$/g$\leq S1 \leq 400$ m$^2$/g, and the specific surface area S of the negative electrode particle satisfies: $1$ m$^2$/g$\leq S \leq 5$ m$^2$/g.

6. The negative electrode particle of claim 1, wherein when the negative electrode particle is of a layered structure, a ratio of a true density $\rho_1$ of the negative electrode particle to a theoretical density $\rho_2$ of the negative electrode particle satisfies: $0.75 \leq \rho_1/\rho_2 \leq 0.95$.

7. The negative electrode particle of claim 6, wherein the true density $\rho_1$ of the negative electrode particle satisfies: $1.8$ g/cm$^3$$\leq \rho_1 \leq 2.1$ g/cm$^3$.

8. A preparing method of a negative electrode particle, comprising:
providing a precursor and a soluble salt;
obtaining a first particle by placing the precursor into a soluble salt system and pre-carbonizing the precursor at a first temperature, wherein the first particle comprises the precursor and a soluble salt dispersed in the precursor, and the first temperature is higher than a melting temperature of the soluble salt;
obtaining a second particle by removing the soluble salt in the first particle; and
obtaining the negative electrode particle by carbonizing the second particle at a second temperature, wherein the second temperature is higher than the first temperature, the negative electrode particle defines a closed pore located inside the negative electrode particle and an open pore located on a surface of the negative electrode particle, a ratio of a pore volume C1 of the closed pore to a pore volume C2 of the open pore satisfies: $6 \leq C1/C2 \leq 11$, and the pore volume C1 of the closed pore satisfies: $0.03$ cm$^3$/g$\leq C1 \leq 0.12$ cm$^3$/g.

9. The preparing method of a negative electrode particle of claim 8, wherein placing the precursor into the soluble salt system and pre-carbonizing the precursor at the first temperature comprise:
placing the precursor into the soluble salt system, and pre-carbonizing the precursor by increasing temperature to the first temperature at a first heating rate R1 satisfying: $0.5°$ C./min$\leq R1 \leq 3°$ C./min, wherein the first temperature T1 satisfies: $400°$ C.$\leq T1 \leq 1000°$ C.

10. The preparing method of a negative electrode particle of claim 9, wherein obtaining the negative electrode particle by carbonizing the second particle at the second temperature comprises:
carbonizing the second particle by increasing temperature to the second temperature at a second heating rate R2 satisfying: $1°$ C./min$\leq R2 \leq 10°$ C./min, wherein the second heating rate R2 is greater than the first heating rate R1, and the second temperature T2 satisfies: $1000°$ C.$\leq T2 \leq 1700°$ C.

11. The preparing method of a negative electrode particle of claim 8, wherein a density of the precursor is greater than or equal to a density of the soluble salt in a molten state.

12. The preparing method of a negative electrode particle of claim 8, wherein after obtaining the second particle by removing the soluble salt in the first particle,
before carbonizing the second particle at the second temperature, the method further comprises:
depositing a carbon layer on a surface of the second particle to close part of open pores located at the surface of the second particle to form closed pores;
or
after carbonizing the second particle at the second temperature, the method further comprises:
depositing the carbon layer on a surface of the carbonized second particle to close part of open pores located at the surface of the carbonized second particle to form closed pores.

13. The preparing method of a negative electrode particle of claim 12, wherein the carbon layer is deposited at a third temperature T3 for a deposition time ranging from 1 h to 4 h, wherein the third temperature T3 satisfies: $800°$ C.$\leq T3 \leq 1200°$ C.

14. The preparing method of a negative electrode particle of claim 8, wherein a carbon content of the precursor ranges from 20% to 70%.

15. The preparing method of a negative electrode particle of claim 8, wherein a mass ratio of the soluble salt to the precursor ranges from 10% to 200%.

16. A negative electrode sheet, comprising:
a current collector; and
an active substance layer, wherein the active substance layer is disposed on a surface of the current collector and comprises a negative electrode particle; and the negative electrode particle defines a closed pore located inside the negative electrode particle and an open pore located on a surface of the negative electrode particle, and a ratio of a pore volume C1 of the closed pore to a pore volume C2 of the open pore satisfies: $6 \leq C1/C2 \leq 11$, and the pore volume C1 of the closed pore satisfies: $0.03$ cm$^3$/g$\leq C1 \leq 0.12$ cm$^3$/g.

17. The negative electrode sheet of claim 16, wherein an average pore diameter D1 of the closed pore of the negative electrode particle satisfies: $0.8$ nm$\leq D1 \leq 2.0$ nm.

18. The negative electrode sheet of claim 16, wherein a ratio of a specific surface area S1 of the closed pore of the negative electrode particle to a specific surface area S of the negative electrode particle satisfies: $40 \leq S1/S \leq 200$.

19. The negative electrode sheet of claim 18, wherein the specific surface area S1 of the closed pore satisfies: $40$ m$^2$/g$\leq S1 \leq 400$ m$^2$/g, and the specific surface area S of the negative electrode particle satisfies: $1$ m$^2$/g$\leq S \leq 5$ m$^2$/g.

20. An energy-storage apparatus, comprising:
electrolyte;
a positive electrode sheet at least partially immersed in the electrolyte;
a separator located at one side of the positive electrode sheet and at least partially immersed in the electrolyte; and
the negative electrode sheet of claim 16, wherein the negative electrode sheet is disposed at one side of the separator away from the positive electrode sheet and at least partially immersed in the electrolyte.

\* \* \* \* \*